(12) United States Patent
Meng et al.

(10) Patent No.: US 11,693,133 B2
(45) Date of Patent: Jul. 4, 2023

(54) CSI(T1) SCINTILLATOR CRYSTAL INCLUDING ANTIOMY AND OTHER MULTI VALANCE CATIONS TO REDUCE AFTERGLOW, AND A RADIATION DETECTION APPARATUS INCLUDING THE SCINTILLATION CRYSTAL

(71) Applicant: SAINT-GOBAIN CERAMICS & PLASTICS, INC., Worcester, MA (US)

(72) Inventors: Fang Meng, Aurora, OH (US); Peter R. Menge, Novelty, OH (US)

(73) Assignee: LUXIUM SOLUTIONS, LLC, Hiram, OH (US)

( * ) Notice: Subject to any disclaimer, the term of this patent is extended or adjusted under 35 U.S.C. 154(b) by 0 days.

(21) Appl. No.: 17/661,520

(22) Filed: Apr. 29, 2022

(65) Prior Publication Data

US 2022/0260733 A1    Aug. 18, 2022

Related U.S. Application Data

(63) Continuation of application No. 17/149,274, filed on Jan. 14, 2021, now Pat. No. 11,340,360, which is a
(Continued)

(51) Int. Cl.
*G01T 1/202* (2006.01)
*C09K 11/62* (2006.01)

(52) U.S. Cl.
CPC ........... *G01T 1/2023* (2013.01); *C09K 11/62* (2013.01)

(58) Field of Classification Search
CPC ..... G01T 1/2023; C09K 11/62; C09K 11/628; C09K 11/7435; G21K 4/00
See application file for complete search history.

(56) References Cited

U.S. PATENT DOCUMENTS 7,759,645 B1    7/2010  Brecher et al.
8,507,878 B1    8/2013  Brecher et al.
(Continued)

FOREIGN PATENT DOCUMENTS

CN    103388179 B    1/2016
EP       2746362 A1    6/2014
(Continued)

OTHER PUBLICATIONS

Nagarkar, V.V. et al., "Scintillation Properties and Applications of Reduced-Afterglow Codoped CsI:Tl," Penetrating Radiation Systems and Applications VIII, Proc. of SPIE, vol. 6707, 2007, pp. 67070D-1-67070D-6.
(Continued)

*Primary Examiner* — David P Porta
*Assistant Examiner* — Meenakshi S Sahu
(74) *Attorney, Agent, or Firm* — Abel Schillinger, LLP; John M. Frank

(57) ABSTRACT

A scintillation crystal can include a cesium halide that is co-doped with thallium and another element. In an embodiment, the scintillation crystal can include CsX:Tl, Me, where X represents a halogen, and Me represents a Group 5A element. In a particular embodiment, the scintillation crystal may have a cesium iodide host material, a first dopant including a thallium cation, and a second dopant including an antimony cation.

20 Claims, 1 Drawing Sheet

Related U.S. Application Data continuation of application No. 16/422,612, filed on May 24, 2019, now Pat. No. 10,928,526.

(60) Provisional application No. 62/676,441, filed on May 25, 2018.

(56) References Cited

U.S. PATENT DOCUMENTS

| | | | |
|---|---|---|---|
| 8,709,155 | B1 | 4/2014 | Brecher et al. |
| 9,678,223 | B2 | 6/2017 | Totsuka et al. |
| 9,869,777 | B2 | 1/2018 | Totsuka |
| 10,928,526 | B2 * | 2/2021 | Meng ............... G21K 4/00 |
| 2007/0108393 | A1 | 5/2007 | Shoji et al. |
| 2008/0093557 | A1 | 4/2008 | Cooke et al. |
| 2014/0203211 | A1 | 7/2014 | Totsuka et al. |
| 2014/0319362 | A1 | 10/2014 | Yasui et al. |
| 2016/0122641 | A1 | 5/2016 | Carey et al. |
| 2017/0355905 | A1 * | 12/2017 | Bourret-Courchesne ............... G01T 1/2023 |

FOREIGN PATENT DOCUMENTS

| | | |
|---|---|---|
| JP | 2011191143 A | 9/2011 |
| JP | 2012131964 A | 7/2012 |
| JP | 2012159394 A | 8/2012 |
| JP | 2013092528 A | 5/2013 |
| JP | 2016130272 A | 7/2016 |
| JP | 2017129580 A | 7/2017 |
| WO | 2015007229 A1 | 1/2015 |

OTHER PUBLICATIONS

Ovechkina E.E. et al., "Multiple doping of CsI:Tl crystals and its effect on afterglow," Radiat Meas., May 2007, pp. 1-10.
Wu, Y. et al., "CsI:Tl+,Yb2+ Ultra-high light yield scintillator with reduced afterglow," CrystEngComm, 2014, vol. 16, pp. 3312-3317.
International Search Report and Written Opinion for PCT/US2019/034020, dated Sep. 18, 2019, 10 pages.
Gektin, A.V. et al., "The Effect of Bi- and Trivalent Cation Impurities on the Luminescence CsI," IEEE Transactions on Nuclear Science, vol. 42, No. 4, Aug. 1995, pp. 285-287.

* cited by examiner

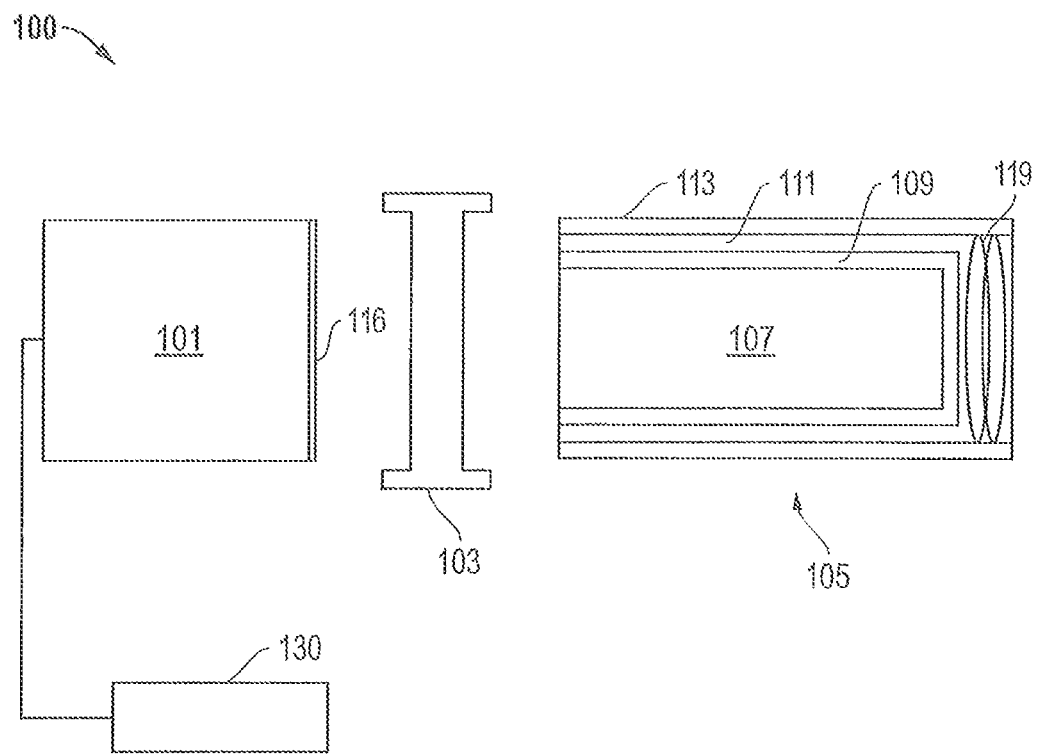

CSI(Tl) SCINTILLATOR CRYSTAL INCLUDING ANTIOMY AND OTHER MULTI VALANCE CATIONS TO REDUCE AFTERGLOW, AND A RADIATION DETECTION APPARATUS INCLUDING THE SCINTILLATION CRYSTAL

CROSS-REFERENCE TO RELATED APPLICATION

This application is a continuation of and claims priority under 35 U.S.C. § 120 to U.S. patent application Ser. No. 17/149,274, entitled "CsI(Tl) SCINTILLATOR CRYSTAL INCLUDING ANTIOMY AND OTHER MULTI VALENCE CATIONS TO REDUCE AFTERGLOW, AND A RADIATION DETECTION APPARATUS INCLUDING THE SCINTILLATION CRYSTAL," by Fang Meng et al., filed Jan. 14, 2021, which claims priority under 35 U.S.C. § 120 to U.S. patent application Ser. No. 16/422,612, entitled "CsI(Tl) SCINTILLATOR CRYSTAL INCLUDING ANTIOMY AND OTHER MULTI VALENCE CATIONS TO REDUCE AFTERGLOW, AND A RADIATION DETECTION APPARATUS INCLUDING THE SCINTILLATION CRYSTAL," by Fang Meng et al., filed May 24, 2019, which claims priority under 35 U.S.C § 119(e) to U.S. Provisional Application No. 62/676,441, entitled "CsI(Tl) SCINTILLATOR CRYSTAL INCLUDING ANTIOMY AND OTHER MULTI VALANCE CATIONS TO REDUCE AFTERGLOW, AND A RADIATION DETECTION APPARATUS INCLUDING THE SCINTILLATION CRYSTAL," by Fang Meng et al., filed May 25, 2018, both of which all applications are assigned to the current assignee hereof and incorporated herein by reference in their entireties.

FIELD OF THE DISCLOSURE

The present disclosure is directed to scintillation crystals including antimony and other multi valance cations and radiation detection apparatuses including such scintillation crystals.

BACKGROUND

Radiation detection apparatuses are used in a variety of applications. For example, scintillators can be used for medical imaging and for well logging in the oil and gas industry as well for the environment monitoring, security applications, and for nuclear physics analysis and applications. CsI:Tl is a scintillation crystal used for radiation detection apparatuses. However, afterglow problems with CsI:Tl limit the functionality, speed, and accuracy in such devices. Further improvements with CsI:Tl scintillation crystals are desired.

BRIEF DESCRIPTION OF THE DRAWINGS

Embodiments are illustrated by way of example and are not limited in the accompanying FIGURES.

FIG. 1 shows an illustration of a radiation detection apparatus in accordance with an embodiment.

Skilled artisans appreciate that elements in the figures are illustrated for simplicity and clarity and have not necessarily been drawn to scale. For example, the dimensions of some of the elements in the FIGURES may be exaggerated relative to other elements to help to improve understanding of embodiments of the invention.

DETAILED DESCRIPTION

The following description in combination with the FIGURES is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, group numbers corresponding to columns within the Periodic Table of the elements use the "New Notation" convention as seen in the CRC Handbook of Chemistry and Physics, $81^{st}$ Edition (2000-2001).

As used herein, the term "group VA element" is intended to mean Bi, Sb, and As in the Periodic Table of the Elements.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

A scintillation crystal can include a cesium halide that is co-doped with thallium and another element. The co-doping can lower afterglow and improve energy resolution, light yield, another suitable scintillation parameter, or any combination thereof. In an embodiment, the scintillation crystal can include CsX:Tl, Me, where X represents a halogen, and Me represents a Group VA element. The selection of a particular co-dopant may depend on the particular scintillation parameters that are to be varied. As used in this specification, co-doping can include two or more different elements (Tl and one or more other elements), and co-dopant refers to the one or more dopants other than Tl.

According to certain embodiments, with particular respect to the composition of the cesium halide, X can be I or a combination of I and Br. When X is a combination of I and Br, X can include at least 50 mol % I or at least 70 mol % I or at least 91 mol % I. In another embodiment, when X is in combination of I and Br, X can include no greater than 99 mol % I. It will be appreciated that the mol % of I in X may be any value between any of the minimum and maximum values noted above. It will be further appreciated that the mol % of I in X may be any value within a range between any of the minimum and maximum values noted above.

According to certain embodiments, with particular respect to the composition of the Tl, Tl can include the concentration within the scintillation crystal CsX:Tl, Me. In certain embodiments, Tl can have a concentration of at least $1 \times 10^{-4}$ mol % Tl, at least $1 \times 10^{-3}$ mol % Tl, or at least 0.01 mol % Tl. In another embodiment, Tl has a concentration no greater than 10 mol % Tl, no greater than 5 mol % Tl, no greater than 0.9 mol % Tl, or no greater than 0.2 mol % Tl. In a particular embodiment, Tl has a concentration in a range of $1 \times 10^{-4}$ mol % to 10 mol %, $1 \times 10^{-3}$ mol % to 0.9 mol %, or 0.01 mol % to 0.2 mol %. It will be appreciated that the mol % of Tl in the scintillation crystal may be any value between any of the minimum and maximum values noted above. It will be further appreciated that the mol % of Tl in the scintillation crystal may be any value within a range between any of the minimum and maximum values noted above.

According to certain embodiments, with particular respect to the composition of the Me, Me can include the concentration within the scintillation crystal CsX:Tl, Me. In an embodiment when the co-dopant is a Group VA element, the dopant concentration of the Group VA element in the scintillation crystal is at least $1 \times 10^{-7}$ mol %, is at least $1 \times 10^{-6}$ mol %, is at least $1 \times 10^{-5}$ mol %, or at least $1 \times 10^{-4}$ mol %. In another embodiment, the concentration of the Group VA element in the scintillation crystal is no greater than 0.01 mol %, no greater than 0.003 mol %, or no greater than 0.002 mol % or no greater than 0.001 mol %. In a particular embodiment, the concentration of the Group VA element in the scintillation crystal is in a range of $1 \times 10^{-7}$ mol % to 0.01 mol %, $1 \times 10^{-6}$ mol % to 0.003 mol %, $1 \times 10^{-5}$ mol % to 0.002 mol %, or $1 \times 10^{-4}$ mol % to $1 \times 10^{-3}$ mol %. It will be appreciated that the mol % of Me in the scintillation crystal may be any value between any of the minimum and maximum values noted above. It will be further appreciated that the mol % of Me in the scintillation crystal may be any value within a range between any of the minimum and maximum values noted above. All of the preceding dopant concentrations are for dopant concentrations in the crystal. In a particular embodiment, the co-dopant is one of a trivalent or pentavalent Group 5A element. In another embodiment, the co-dopant is a trivalent or pentavalent antimony, or any combinations thereof.

According to certain embodiments, the concentration of dopants in the crystal may or may not be different from the concentrations of dopants in the melt from which the scintillation crystal is formed. The concentrations of Tl and Group VA co-dopants in a melt in forming the crystal can include any of the values as previously described.

According to still other embodiments, when selecting a co-dopant, different considerations may determine which particular elements are better suited for improving particular scintillation parameters as compared to other elements. The description below is to be used as general guidance and not construed as limiting particular scintillation parameters to particular co-dopants.

According to yet other embodiments, light yield of the scintillation crystal can be increased with a co-dopant, Me, as compared to the composition of the scintillation crystal without the co-dopant. In an embodiment, the scintillation crystal with the co-dopant has a light yield that is at least 1%, at least 5%, at least 10% more than a light yield of a CsI:Tl crystal without the co-dopant when the light yield of the scintillation crystal with the co-dopant and the CsI:Tl crystal without the co-dopant are measured at 22° C. and exposed to gamma radiation having an energy of 662 keV.

According to yet other embodiments, the afterglow of the scintillation crystal can be reduced with a co-dopant, Me, as compared to the composition of the scintillation crystal without the co-dopant. In certain embodiments, the scintillation crystal with the co-dopant has an afterglow that is at least 20%, or at least 30%, or at least 45%, or at least 50% less than, or at least 55% less than an afterglow of a CsI:Tl crystal without the co-dopant when the co-doped scintillation crystal and CsI:Tl crystal without the co-dopant were coupled to silicon photodiodes and exposed to an X-ray beam (120 keV, tungsten target).

The scintillation crystal can be formed using any one of a variety of crystal growing techniques including Bridgman, Czochralski, Kyropoulos, Edge-defined Film-fed Growth (EFG), Stepanov, Gradient-Freeze or the like. The starting materials include a cesium halide and halides of the dopants. In an embodiment, the starting materials can include CsI and TlI, and depending on the co-dopant, the starting material can include any one or more of $SbI_3$, $SbI_5$, $BiI_3$, $BiI_5$, $AsI_3$, or the like. After determining a desired composition of the scintillation crystal, the segregation coefficients for the dopants with respect to the base material (e.g., CsI) can be used to determine amounts of starting materials to use in the melt. Crystal growing conditions can the same as used in forming CsI:Tl or may have relatively small changes to optimize the crystal formation process.

Any of the scintillation crystals as previously described can be used in a variety of applications. Exemplary applications include gamma ray spectroscopy, isotope identification, Single Photon Emission Computer Tomography (SPECT) or Positron Emission Tomography (PET) analysis, x-ray imaging, oil well-logging detectors, and detecting the presence of radioactivity. The scintillation crystal can be used for other applications, and thus, the list is merely exemplary and not limiting. A couple of specific applications are described below.

FIG. 1 illustrates an embodiment of a radiation detection apparatus 100 that can be used for gamma ray analysis, such as Single Photon Emission Computer Tomography (SPECT) or step-through X-ray machine. As shown in FIG. 1 and in accordance with embodiments described herein, the radiation detection apparatus 100 may include a photosensor 101, an optical interface 103, and a scintillation device 105. Although the photosensor 101, the optical interface 103, and the scintillation device 105 are illustrated in FIG. 1 as being separate from each other, it will be appreciated that, according to certain embodiments, photosensor 101 and the scintillation device 105 can be coupled to the optical interface 103, with the optical interface 103 disposed between the photosensor 101 and the scintillation device 105. According to still other embodiments, the scintillation device 105 and the photosensor 101 can be optically coupled to the optical interface 103 with other known coupling methods, such as the use of an optical gel or bonding agent, or directly through molecular adhesion of optically coupled elements.

According to yet other embodiments, the photosensor 101 may be a photomultiplier tube (PMT), a semiconductor-based photomultiplier, or a hybrid photosensor. The photosensor 101 can receive photons emitted by the scintillation device 105, via an input window 116, and produce electrical pulses based on numbers of photons that it receives. The photosensor 101 is electrically coupled to an electronics module 130. The electrical pulses can be shaped, digitized, analyzed, or any combination thereof by the electronics module 130 to provide a count of the photons received at the photosensor 101 or other information. The electronics module 130 can include an amplifier, a pre-amplifier, a discriminator, an analog-to-digital signal converter, a photon counter, a pulse shape analyzer or discriminator, another electronic component, or any combination thereof. The photosensor 101 can be housed within a tube or housing made of a material capable of protecting the photosensor 101, the electronics module 130, or a combination thereof, such as a metal, metal alloy, other material, or any combination thereof.

The scintillation device 105 may include a scintillation crystal 107 can be any one of the scintillation crystals previously described that are represented by a general formula of CsX:Tl, Me, where X represents a halogen, and Me represents a Group 5A element. The scintillation crystal 107 is substantially surrounded by a reflector 109. In one embodiment, the reflector 109 can include polytetrafluoroethylene (PTFE), another material adapted to reflect light emitted by the scintillation crystal 107, or a combination thereof. In an illustrative embodiment, the reflector 109 can be substantially surrounded by a shock absorbing member 111. The scintillation crystal 107, the reflector 109, and the shock absorbing member 111 can be housed within a casing 113.

The scintillation device 105 may include at least one stabilization mechanism adapted to reduce relative movement between the scintillation crystal 107 and other elements of the radiation detection apparatus 100, such as the optical interface 103, the casing 113, the shock absorbing member 111, the reflector 109, or any combination thereof. The stabilization mechanism may include a spring 119, an elastomer, another suitable stabilization mechanism, or a combination thereof. The stabilization mechanism can be adapted to apply lateral forces, horizontal forces, or a combination thereof, to the scintillation crystal 107 to stabilize its position relative to one or more other elements of the radiation detection apparatus 100.

As illustrated in FIG. 1, the optical interface 103 may be adapted to be coupled between the photosensor 101 and the scintillation device 105. The optical interface 103 may also be adapted to facilitate optical coupling between the photosensor 101 and the scintillation device 105. The optical interface 103 can include a polymer, such as a silicone rubber, that is polarized to align the reflective indices of the scintillation crystal 107 and the input window 116. In other embodiments, the optical interface 103 can include gels or colloids that include polymers and additional elements.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

Embodiment 1. A scintillator crystal comprising: a cesium iodide host material; a first dopant comprising a thallium cation, a molar concentration of said first dopant being less than 10%, and a second dopant comprising an antimony cation, the second dopant resulting in the scintillator having a reduced afterglow.

Embodiment 2. A scintillator crystal comprising: a cesium iodide host material; a first dopant comprising a thallium cation, a molar concentration of said first dopant being less than 10%; and a second dopant comprising a group VA element, wherein the group VA element is at least partially in its 3+ oxidation state, wherein the quantity of the second dopant in the scintillator comprises between $1 \times 10^{-7}$ mol % and 0.1 mol %.

Embodiment 3. A radiation detection apparatus comprising: a housing; a scintillator within the housing, the scintillator comprising: a cesium iodide host material; a first dopant comprising a thallium cation, a molar concentration of said first dopant being less than 10%; and a second dopant comprising an antimony cation, the second dopant resulting in the scintillator having a reduced afterglow.

Embodiment 4. The scintillator crystal of embodiment 1, wherein the quantity of antimony in the scintillator crystal comprises between $1 \times 10^{-7}$ mol % and $1 \times 10^{-2}$ mol % antimony.

Embodiment 5. The scintillator crystal of embodiment 2, further comprising a third dopant, and wherein the second dopant comprises trivalent antimony and the third dopant comprises trivalent bismuth.

Embodiment 6. The scintillator crystal of embodiment 2, further comprising a third dopant, and wherein the second dopant comprises pentavalent bismuth and the third dopant comprises pentavalent antimony.

Embodiment 7. The scintillator crystal or radiation detection apparatus of any one of embodiments 1, 2, or 3, wherein the scintillator crystal comprises at least $1 \times 10^{-7}$ mol % or at least $3 \times 10^{-4}$ mol % or at least $3.2 \times 10^{-4}$ mol % or at least $4 \times 10^{-4}$ mol % or at least $6 \times 10^{-4}$ mol % antimony.

Embodiment 8. The scintillator crystal or radiation detection apparatus of any one of embodiments 1, 2, or 3, wherein the scintillator crystal comprises less than $1 \times 10^{-3}$ mol % antimony and wherein the scintillator crystal has a light output intensity of less than 0.4% at 100 ms after exposure to an X-ray irradiation, relative to a light output intensity measured during the X-ray irradiation.

Embodiment 9. The scintillator crystal or radiation detection apparatus of any one of embodiments 1, 2, or 3, wherein the scintillator crystal comprises less than $1 \times 10^{-3}$ mol % antimony and wherein the scintillator crystal has a light output intensity of less than 0.3% at 500 ms after exposure to an X-ray irradiation, relative to a light output intensity measured during the X-ray irradiation.

Embodiment 10. The scintillator crystal or radiation detection apparatus of any one of embodiments 1, 2, or 3, wherein the scintillator crystal contains more than $1 \times 10^{-6}$ mol % of a co-dopant cation capable of existing in more than one oxidation state within the crystal matrix.

Embodiment 11. The scintillator crystal or radiation detection apparatus of any one of embodiments 1, 2, or 3, wherein the scintillator crystal comprises no greater than 0.01 mol %, no greater than 0.003 mol %, or no greater than 0.002 mol % or no greater than 0.001 mol % of the second dopant.

Embodiment 12. The radiation detection apparatus of embodiment 3, wherein the radiation detection apparatus is capable of inspecting more than 300 bags per hour during an X-ray irradiation.

Embodiment 13. The radiation detection apparatus of embodiment 3, wherein the radiation detection apparatus is capable of inspecting more than 1000 bags per hour during a Computed tomography irradiation.

Embodiment 14. The scintillator crystal or radiation detection apparatus of any one of embodiments 1 or 3, wherein the afterglow is reduced by at least 20% or at least 30% or at least 45%.

EXAMPLES

The concepts described herein will be further described in the Examples, which do not limit the scope of the invention described in the claims. The Examples demonstrate performance of scintillation crystals of different compositions. Numerical values as disclosed in this Examples section may be averaged from a plurality of readings, approximated, or rounded off for convenience. Samples were formed using a vertical Bridgman crystal growing technique.

Scintillation crystal samples CS1, S1, S2, S3, S4, and S5 were formed to compare afterglow of the co-doped samples to a CsI:Tl standard. The compositions of the scintillation crystal samples are listed in Table 1. Further, each sample CS1, S1, S2, S3, S4, and S5 was tested to determine afterglow (AG) and relative light yield. CS1, S1, S2, S3, S4, and S5 contained approximately 0.10 mol % Tl. For afterglow measurements, the samples were coupled to silicon photodiodes and exposed to an X-ray beam (120 keV, tungsten target). The photodiode signal was sampled at 100 ms and 500 ms following X-ray beam shutoff. The ratio of these signal intensities to the signal intensity during X-ray beam exposure is defined as the afterglow (AG). Relative light yield testing was performed at room temperature (approximately 22° C.) by exposing the scintillation crystals to $^{137}Cs$ and using a photomultiplier tube and multichannel analyzer to obtain a spectrum. The results of the performance testing for the scintillation crystal samples CS1, S1, S2, S3, S4, and S5 are also listed in Table 1.

TABLE 1

Standard, and Sb Compositions and Performance

| Sample | Composition | Sb in Melt (mol %) | Sb in Crystal | AG at 100 ms (%) | AG at 500 ms (%) | Relative light yield (%) |
|---|---|---|---|---|---|---|
| CS1 | CsI:Tl (standard) | — | — | 0.60 | 0.40 | 100 |
| S1 | CsI:Tl, Sb | 0.02 | 3.2 ppm | 0.25 | 0.13 | 101 |
| S2 | CsI:Tl, Sb | 0.01 | <0.02 ppm (below detection limit) | 0.32 | 0.2 | 106 |
| S3 | CsI:Tl, Sb | 0.04 | 4.3 ppm | 0.38 | 0.15 | 93 |
| S4 | CsI:Tl, Sb | 0.06 | <0.02 ppm (below detection limit) | 0.39 | 0.19 | 100 |
| S5 | CsI:Tl, Sb | 0.1 | 9.6 | 0.43 | 0.19 | 85 |

As shown in the table, the Sb co-doped sample has a lower afterglow as compared to the undoped sample while maintaining the overall light yield. Advantageously, small amounts of the co-dopant as described in detail above are needed to show a reduction in afterglow. Scintillation crystal S1 shows a reduction in after glow of at least 58% at 100 ms and 67.5% at 500 ms as compared to the undoped sample. Scintillation crystal S2 shows a reduction in after glow of at least 46.7% at 100 ms and 50% at 500 ms as compared to the undoped sample. Scintillation crystal S3 shows a reduction in after glow of at least 37% at 100 ms and 62.5% at 500 ms as compared to the undoped sample. Scintillation crystal S4 shows a reduction in after glow of at least 35% at 100 ms and 52.5% at 500 ms as compared to the undoped sample. Scintillation crystal S5 shows a reduction in afterglow of at least 29% at 100 ms and 52.5% at 500 ms as compared to the undoped sample.

Note that not all of the activities described above in the general description of the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A scintillator crystal comprising:
   a cesium iodide host material;
   a first dopant comprising thallium;
   a second dopant comprising antimony, wherein the scintillator crystal comprises between $1 \times 10^{-7}$ mol % and $1 \times 10^{-2}$ mol % antimony; and
   a third dopant comprising bismuth, wherein the scintillator crystal has a reduced afterglow.

2. The scintillator crystal of claim 1, wherein a molar concentration of the first dopant is less than 10%.

3. The scintillator crystal of claim 1, wherein the second dopant comprises trivalent antimony.

4. The scintillator crystal of claim 1, wherein the scintillator crystal comprises less than $1 \times 10^{-3}$ mol % antimony and wherein the scintillator crystal has a light output intensity of less than 0.4% at 100 ms after exposure to an X-ray irradiation, relative to a light output intensity measured during the X-ray irradiation.

5. The scintillator crystal of claim 1, wherein the scintillator crystal comprises less than $1\times10^{-3}$ mol % antimony and wherein the scintillator crystal has a light output intensity of less than 0.3% at 500 ms after exposure to an X-ray irradiation, relative to a light output intensity measured during the X-ray irradiation.

6. The scintillator crystal of claim 1, wherein the scintillator crystal contains more than $1\times10^{-6}$ mol % of a second codopant capable of existing in more than one oxidation state within the crystal matrix.

7. The scintillator crystal of claim 1, wherein a concentration of the second dopant in the scintillator crystal is greater than zero and no greater than 0.003 mol %.

8. The scintillator crystal of claim 1, wherein the second dopant comprises pentavalent antimony and the third dopant comprises pentavalent bismuth.

9. A scintillator crystal comprising:
   a cesium iodide host material;
   a first dopant comprising thallium;
   a second dopant comprising a group VA element, wherein the scintillator crystal comprises no greater than 0.1 mol %; of the second dopant; and
   a third dopant comprising bismuth.

10. The scintillator crystal of claim 9, wherein the group VA element is at least partially in its 3+ oxidation state.

11. The scintillator crystal of claim 9, wherein the second dopant comprises pentavalent antimony.

12. The scintillator crystal of claim 9, wherein the scintillator crystal comprises at least $3\times10^{-4}$ mol % antimony.

13. The scintillator crystal of claim 9, wherein the scintillator crystal comprises less than $1\times10^{-3}$ mol % antimony and wherein the scintillator crystal has a light output intensity of less than 0.5% at 100 ms after exposure to an X-ray irradiation, relative to a light output intensity measured during the X-ray irradiation.

14. The scintillator crystal of claim 9, wherein the scintillator crystal comprises less than $1\times10^{-3}$ mol % antimony and wherein the scintillator crystal has a light output intensity of less than 0.2% at 500 ms after exposure to an X-ray irradiation, relative to a light output intensity measured during the X-ray irradiation.

15. The scintillator crystal of claim 9, wherein the scintillator crystal contains more than $1\times10^{-6}$ mol % of the second co-dopant capable of existing in more than one oxidation state within the crystal matrix.

16. The scintillator crystal of claim 9, wherein the scintillator crystal comprises no greater than 0.003 mol % of the second dopant.

17. A scintillator crystal formed by a growth process, comprising:
   providing a cesium iodide host material;
   doping with thallium, wherein a molar concentration of said thallium is less than 10%;
   codoping with antimony, wherein a concentration of the second dopant in the melt is greater than zero and no greater than 0.01 mol %; and
   codoping with bismuth to produce a scintillator crystal with a reduced afterglow.

18. The scintillator crystal formed by the growth process of claim 17, wherein the growth process is a Bridgman growth process.

19. The scintillator crystal formed by the growth process of claim 17, wherein the formed scintillator crystal comprises between $1\times10^{-7}$ mol % and $1\times10^{-2}$ mol % antimony.

20. The scintillator crystal formed by the growth process of claim 17, wherein the formed scintillator crystal comprises no greater than 0.003 mol % antimony.

* * * * *